Patented Sept. 13, 1949

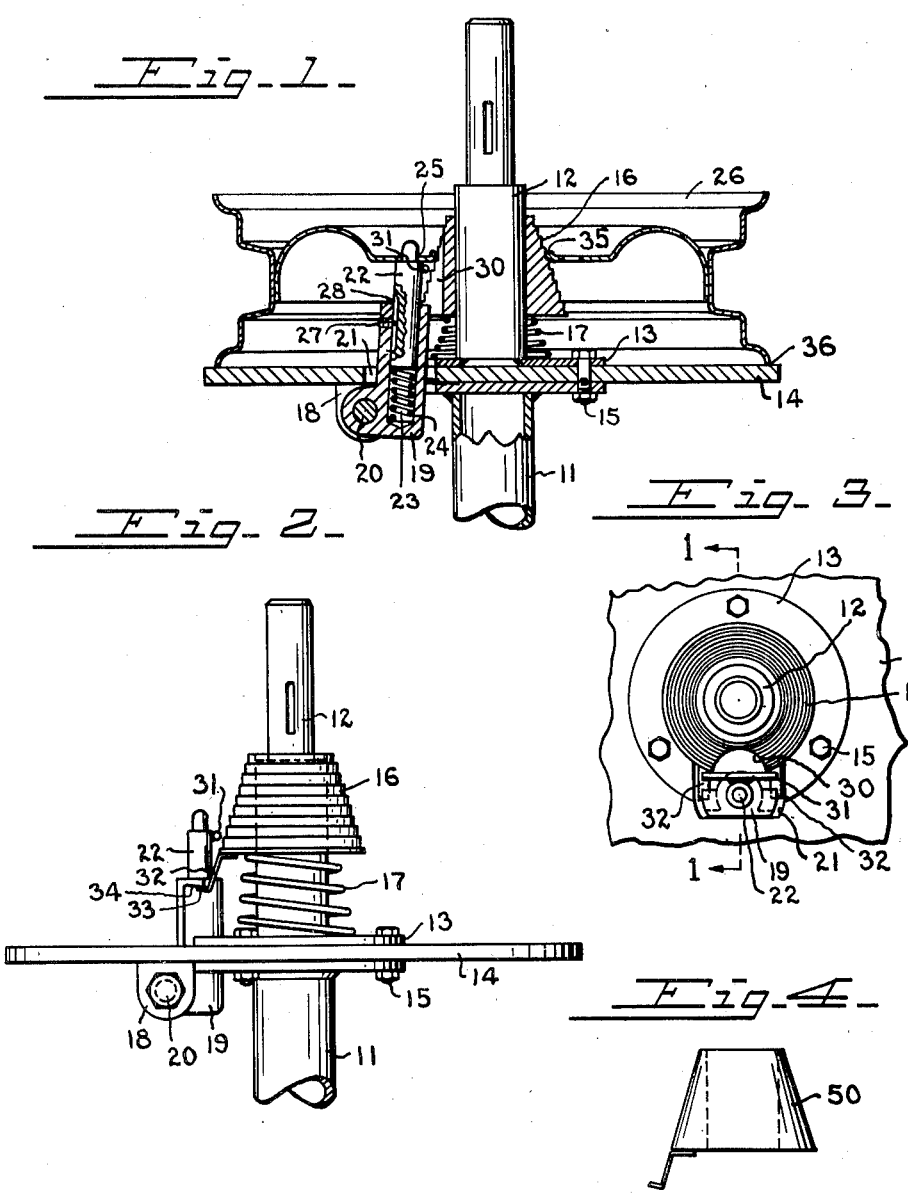

2,481,926

UNITED STATES PATENT OFFICE 2,481,926

SELF-ADJUSTING AND LOCKING WHEEL SUPPORTING DEVICE

Robert D. Henderson, Cincinnati, Ohio

Application May 6, 1947, Serial No. 746,273

5 Claims. (Cl. 144—288)

This invention relates to improved means for supporting an automobile wheel during tire mounting and dismounting operations.

Present day automobile wheels have a central aperture and a series of concentrically located lug holes thereabout for facilitating attachment of a wheel to a brake drum. The diameter of the central aperture varies in accordance with the make and model of the car, however the center line of the lug holes of all wheels are positioned approximately the same radial distance from the peripheral edge of the central aperture of a wheel. I have devised my improved supporting structure to automatically center drop center wheels on a support whereby one of the lug holes thereof will be automatically engaged by a latching pin to prevent the wheel from turning on the support.

An object of my invention is to provide means for centering a wheel on a support. A further object is to provide gravity means actuated by the centering means for engaging and maintaining the wheel against rotation.

My invention will be further readily understood from the following description and claims, and from the drawings, in which latter:

Fig. 1 is a vertical cross-section of the device, partly broken away and taken in the plane of the line 1—1 of Fig. 3.

Fig. 2 is a side view of the same.

Fig. 3 is a plan view of the same, partly broken away.

Fig. 4 is a side view of a modified cone.

My improved supporting device comprises a stepped cone 16 slidably mounted on a shaft 12 which projects upwardly from a wheel supporting plate 14 relative to which it is rigidly mounted. If desired, plate 14 may be secured to and carried by a standard 11, or any other suitable supporting medium.

The diameter of the various stepped planes of cone 16 are dimensioned to engage one of the various sized central apertures found in the various types and sizes of wheels used by the automotive industry, it being understood that the height or width dimension of each plane or step is of a dimension at least equal to the thickness of material from which the various commercial automotive wheels are fabricated.

Cone 16 is yieldably and normally urged outwardly or upwardly from plate 14 by means such as a spring 17 interposed between the adjacent faces of the cone and supporting plate. By reason of this construction, the center aperture 35 of a wheel may be quickly and easily centered with reference to shaft 12, it being understood that spring 17 will automatically compensate for variations in the depth of various wheels.

A lug-pin locating bracket 19 is pivotally mounted relative to shaft 12, such as, by way of example, to a pin 20 secured to and spanning a pair of mounting ears 18 provided on plate 14. As best disclosed in Fig. 1, bracket 19 includes an axial bore 24 preferably disposed between shaft 12 and pin 20, whereby said bracket will normally fall or be urged toward said shaft. While this is the preferred manner of mounting bracket 19, it should be understood that a spring or other equivalent means may be utilized to effect a similar result.

A pin 22 is slidably received within bore 24 of bracket 19, said pin being yieldably and normally urged outwardly by a spring 23 interposed between the lower end of the pin and the bottom of bore 24. A closed or double ended slot 28 may be milled lengthwise of pin 22 for receiving the end of a stop or interfering member 27 secured to housing 19, thereby limiting the overall travel of the pin for precluding its accidental or unintentional complete withdrawal from bore 24. If desired the outer end of the pin may be reduced somewhat in diameter and rounded off to facilitate its ease of entry into the lug-hole of a wheel.

A pair of laterally spaced substantially L-shaped cone guide stops 32 are secured to and carried by the cone by means of an attachment leg fastened to the lower face of the cone. The free, lower or outer ends terminate in outturned fingers 33, whereas the intermediate portion is constructed and arranged to project downwardly from and as a continuation of the taper of the cone, see Figs. 2 and 4.

A pair of stop members 34 are provided on opposite sides of lug locating bracket 19 engageable by fingers 33 of the cone guide stops 32 for limiting the maximum amount by which spring 17 may space the cone from table 14, and thereby preclude loss or unintentional removal of the cone from shaft 12. The stop members likewise preclude relative rotation between the cone and the shaft.

With reference now to Figs. 1 and 3, it will be noted that a vertical groove 30 is provided in the cone for receiving the lug bracket incident to correlated movement of said parts, as hereinafter more fully set forth.

A cross pin 31 is secured to and carried by pin 22 in such a manner as to span groove 30 and slidably engage the edges thereof. In this manner the spacing of the lug-hole engaging pin 22 is automatically set or predetermined to correspond with the diameter of the central opening 35 of the particular wheel centered on cone 16 and supported on table 14. With reference to Fig. 2 it will be observed that as the cone is lowered bracket 19 and pin 22 will tilt toward shaft 12 by an amount determined by the relationship and engagement of pin 31 with the edge of groove 30, thereby always maintaining pin 22 in predetermined relationship with a particular step of the cone.

Thus when a wheel is placed on the table, the central aperture 35 of the wheel engages the step on the cone comparable to the size of the aperture and forces the cone downwardly until the rim 36 of the wheel rests on the table. The wheel is placed on the table with a lug hole over the pin 22 which will readily enter the lug hole, as the pin 22 moves in or out depending on the engaging portion of the cone with the central aperture of the wheel. The pin 22 after engaging the lug hole moves downwardly against the spring 23 and prevents the wheel from turning on the table.

If desired a wheel may be centered on cone 16 without regard to prealignment of pin 22 with a lug hole, after which the wheel may be rotated for moving a lug hole in alignment with the pin 22 which will be projected upwardly into the lug hole by spring 23.

In conclusion, it should be noted that the cone guide stops also function as a continuation of the side edges of the cone, being engageable and spanned by pin 31 in those instances when the pin is lowered below the cone.

Thus wheels having various sized central apertures automatically are centered and held against rotation in an expeditious manner.

In Fig. 4, I have shown a modified cone 50 wherein the face of the cone is smooth for engagement of the various sized apertures in the wheels.

Having thus fully described my invention, what I claim as new and desire to secure by Letters Patent, is:

1. A wheel supporting device comprising a table, a shaft extending upwardly from said table, a cone slideably mounted on said shaft, means for normally maintaining said cone in raised position, a groove in the side of said cone, a guide pivoted on said table, one end of said guide movable into said groove, a spring pressed pin extending upwardly from said guide, and a cross-pin on said pin contacting said cone and spanning said groove.

2. A wheel supporting device comprising a table, a shaft extending upwardly from said table, a cone slideably mounted on said shaft, means for normally maintaining said cone in raised position, a vertical groove in the side of said cone, extensions depending from said cone, a guide pivoted on said table, one end of said guide movable into said groove, a spring pressed pin carried by and extending upwardly from said guide, a cross-pin on said pin contacting said cone and spanning said groove, said extensions disposed on opposite sides of said guide and including means engageable with the guide for limiting axial movement of the cone along said shaft.

3. A device for centering and locking a wheel of the type characterized by a central aperture having a series of lug bolt holes in spaced relationship therewith, which device comprises a member dimensioned to support the outer rim of a wheel, a shaft projecting from said member, a stepped cone centered on and slidably engaging said shaft, means operable for normally and yieldably spacing said cone from said member, a bracket having a central bore pivotally secured to said member, a pin housed in and slidably engaging said bore, means operable for precluding accidental or unintentional displacement of said pin from its bore, means for normally and yieldingly urging said pin outwardly of said bracket, a pair of laterally spaced cone guide stops projecting from said cone each terminating in outturned fingers, means in opposite sides of said bracket engageable one each by said fingers for establishing the maximum spacing of said cone from said member and for precluding accidental or unintentional removal of said cone from said shaft, a follower carried by said pin and ridable upon said cone for locating the end of said pin in predetermined relationship with said shaft and on the radius of the lug-holes of the wheel, said pin dimensioned to be received in and project through a lug hole aligned therewith.

4. A universal device for automatically centering and locking various sized automotive wheels to a support member, wherein the bolt hole circles of the mounting flanges of such wheels bear a substantially constant relationship with the circumference of the central aperture through its corresponding mounting flange, which device comprises a member dimensioned to support the outer rim of a wheel, a shaft extending from said member, an axially shiftable cone on said shaft for selectively engaging the central aperture of a wheel for centering the wheel on said member, means operable for normally and yieldably spacing said cone from said member and for maintaining said cone in contacting relationship with the central aperture of a wheel supported on said member, extensions projecting downwardly from said cone as a continuation of the cone taper, an axially shiftable wheel locking element pivotally secured relative to said member for engaging the bolt hole of a wheel, and means on said element normally contacting said cone throughout its axial travel and ridable upon said extensions for keeping the end of said locking element a predetermined constant distance away from the taper of said cone.

5. A device for automatically centering and non-revolubly locking an automobile wheel relative to a common center, comprising a base member having an aperture therein, a shaft projecting from said member on one side of said aperture, a bracket, mounting means on the other side of said aperture secured to and projecting from said base member in a direction opposite from said shaft, said bracket loosely disposed in said aperture and pivotally connected at its lower end to said mounting means whereby those portions of the bracket above said connection will normally be urged towards said shaft, said bracket having an axial bore, a pin slideably engaging said bore and extending beyond said bracket, a cone centered on and slideably engaging said shaft, means for normally and yieldably disposing the base of said cone above the free outer end of said bracket in spaced relationship with said member, a vertical groove in the side of said cone, a follower carried by said pin and ridable on said cone in spanning relationship with said groove for disposing said pin in predetermined relationship with said shaft and in constant relationship with the taper of said cone for all positions of said cone on said shaft.

ROBERT D. HENDERSON.

REFERENCES CITED

The following references are of record in the file of this patent:

UNITED STATES PATENTS

| Number | Name | Date |
|---|---|---|
| 220,995 | Shedlock | Oct. 28, 1879 |
| 1,756,970 | Booth | May 6, 1930 |
| 2,075,421 | Bennett | Mar. 30, 1937 |
| 2,171,282 | Wochner | Aug. 29, 1939 |
| 2,178,101 | Hatch | Oct. 31, 1939 |
| 2,194,936 | Hatch | Mar. 26, 1940 |
| 2,233,371 | Smith | Feb. 25, 1941 |
| 2,270,657 | Kraft | Jan. 20, 1942 |